United States Patent
Ruemmler (10) Patent No.: US 8,132,171 B2
(45) Date of Patent: Mar. 6, 2012

(54) METHOD OF CONTROLLING THREAD ACCESS TO A SYNCHRONIZATION OBJECT

(75) Inventor: Christopher P. Ruemmler, Morgan Hill, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1474 days.

(21) Appl. No.: 11/615,935

(22) Filed: Dec. 22, 2006

(65) Prior Publication Data

US 2008/0155546 A1 Jun. 26, 2008

(51) Int. Cl.
*G06F 9/46* (2006.01)
(52) U.S. Cl. ........................................................ 718/102
(58) Field of Classification Search .................... 718/102
See application file for complete search history.

(56) References Cited

U.S. PATENT DOCUMENTS

| | | | |
|---|---|---|---|
| 6,578,033 B1 * | 6/2003 | Singhal et al. ........................ 1/1 |
| 6,910,212 B2 * | 6/2005 | Brenner et al. ............... 718/104 |
| 7,539,678 B2 * | 5/2009 | Demsey et al. ........................ 1/1 |
| 7,594,234 B1 * | 9/2009 | Dice ............................. 718/108 |
| 2005/0080963 A1 * | 4/2005 | Schopp ......................... 710/200 |
| 2007/0136725 A1 * | 6/2007 | Accapadi et al. ............. 718/100 |

* cited by examiner

*Primary Examiner* — Meng An
*Assistant Examiner* — Mengyao Zhe (57) ABSTRACT

A method of controlling thread access to a synchronization object is described. The method comprises waking a sleeping first thread after release, by a second thread, of a synchronization object in a normal state and causing, by the first thread, the synchronization object to transition to a want-lock state, the synchronization object being acquirable by the first thread prior to being acquirable by the second thread.

23 Claims, 7 Drawing Sheets

METHOD OF CONTROLLING THREAD ACCESS TO A SYNCHRONIZATION OBJECT

BACKGROUND

Executing processes on a computer system may comprise all or a portion of operating systems, application programs, device drivers, etc. Processor executable instructions, e.g., which comprise executing processes, may be provided in the form of one or more threads for execution by the processor.

A process is a container for a set of instructions that carry out all or a portion of the overall task of a program. Processes comprise executing application programs, managed by operating system components such as a scheduler and a memory management program and/or a portion of the operating system. A process context comprises the executable instructions, data (used by the executable instructions), and stack (memory used when the process is running). A process is a representation of an executing program and a thread is a fraction of the program. A thread is a sequence of executing instructions of a program. Certain threads exist within the context of a process and provide a means to address and execute smaller segments of the process. Threads allow programs to be broken up into logically distinct tasks. Each thread can be scheduled, synchronized, and prioritized with respect to one or more threads.

When a thread becomes ready for execution by a processor it is said to be a "runnable" thread. The thread may execute after acquiring a lock for synchronization, e.g., a synchronization object. When a thread acquires the synchronization lock, the processor selects and executes the thread.

Programmers use software locks (hereafter referred to as locks or synchronization objects) in order to synchronize multiple threads of execution needing to access or modify shared or otherwise interdependent data. In complex multi-threaded software, multiple locks are acquired and held simultaneously during execution of a thread.

Multiple threads which are made runnable at one time may contend for a synchronization object. When this happens, contention on synchronization objects protecting the state of the threads can become high. In addition, starvation of threads can occur as some threads may not obtain the synchronization object which the threads are awakened to obtain.

In some approaches, a single thread is awakened on each synchronization object release resulting in the possibility that multiple threads may end up "in flight", i.e., starting to wake up prior to attempting to obtain the synchronization object, for synchronization objects with short hold times (i.e., the amount of time the thread holds onto the synchronization object) because the first thread awake may be in the process of being runnable while a subsequent thread obtains the synchronization object.

The subsequent thread may then release the synchronization object causing the awakening of the next sleeping thread waiting on the synchronization object. At this point, two threads are "in-flight" at once attempting to awaken in order to obtain the synchronization object. Multiple threads in flight may cause contention on internal synchronization objects used to maintain thread state. The contention may cause an overall slowdown in synchronization object throughput and consume excessive amounts of processing resources.

Multiple threads contending for a synchronization object may also result in starvation of threads waiting for the synchronization object to execute. For example, if a thread is unable to obtain the synchronization object each time the thread requests the synchronization object, the thread may continuously attempt to obtain the synchronization object.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
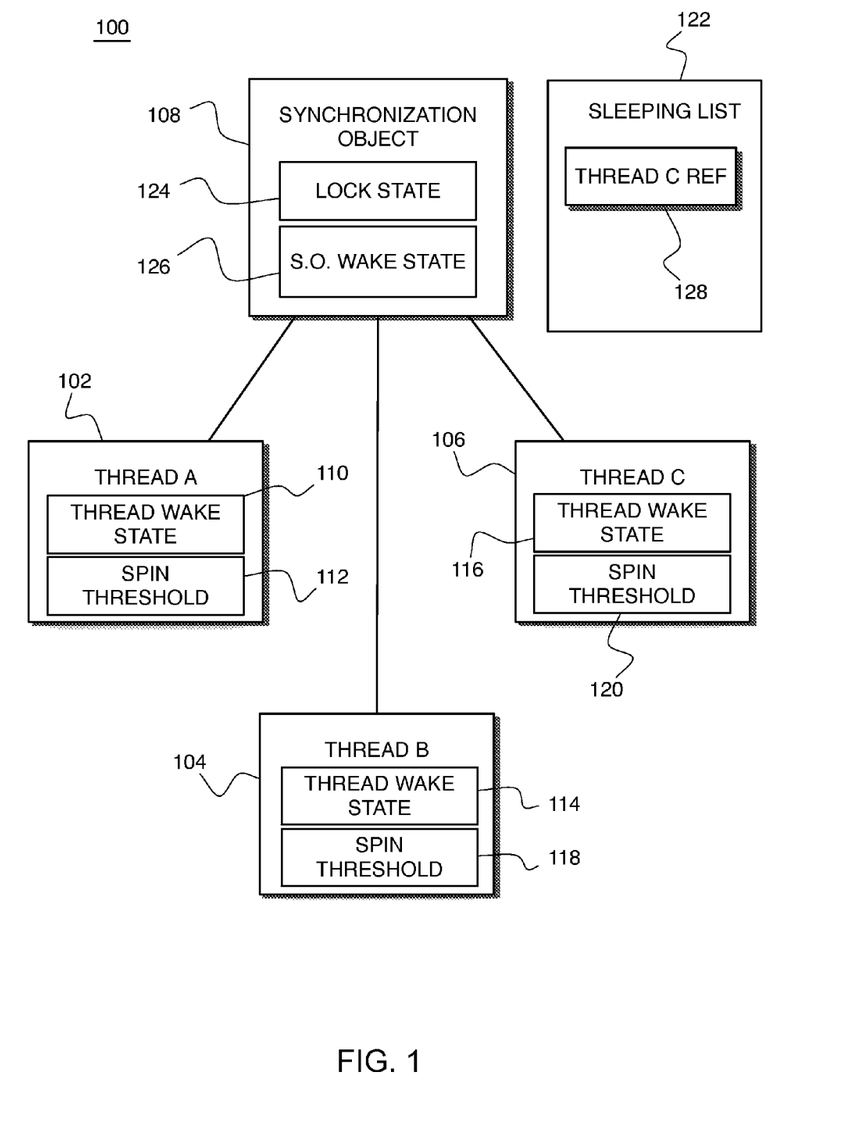
FIG. 1 is a high-level block diagram according to an embodiment.

FIG. 1 depicts a high-level functional block diagram of a portion 100 of executable instructions according to an embodiment. As depicted, several threads, i.e., thread A 102, thread B 104, and thread C 106, attempt to acquire a synchronization object 108, i.e., each of the threads attempts to obtain a lock to prevent the other threads from executing a particular set of instructions. For clarity and ease of description, three threads are described herein. In some embodiments, there may be a greater or lesser number of threads. In some embodiments, synchronization object 108 may be one or more variables, at least one instantiated object, and/or one or more additional implemented representations.

Thread A 102 comprises a thread wake state parameter 110 storing a value indicating whether the thread has been woken up for execution and a spin threshold parameter 112 storing a threshold value indicative of an amount of time, e.g., a time period, during which the thread may attempt to acquire synchronization object 108 prior to sleeping (also referred to as a "busy wait time"). Threads 104 and 106 each comprise a thread wake state parameter 114 and 118, and a spin threshold parameter 116 and 120, respectively.

If thread A 102 has been woken for execution, e.g., from a sleeping list 122, as a result of a thread releasing synchronization object 108, then thread wake state 110 is set to a value indicating that the thread has been woken, e.g., a true value stored in the thread wake state parameter. That is, a thread having a thread wake state parameter value of true indicates that another thread has caused the thread to wake and the woken thread has not slept since being woken. At the initialization of thread 102, e.g., instantiation of the thread, and after acquisition of synchronization object 108, thread wake state 110 is set to a value indicating that the thread has not been woken as a result of another thread releasing synchronization object 108.

Spin threshold parameter 112 may comprise a value corresponding to a maximum time period during which thread A 102 will continue to attempt to acquire synchronization object 108. In some other embodiments, spin threshold parameter 112 may comprise a value specifying a maximum number of attempts to acquire synchronization object 108 which may be performed by thread A 102 prior to the thread sleeping. In some embodiments, spin threshold parameter 112 may further comprise a minimum time period during which thread A 102 will continue to attempt to acquire synchronization object 108. In still further embodiments, a set of values may be specified to limit the busy wait time of thread A 102. In some embodiments, a global spin threshold parameter may be used for determining the busy wait time for a thread. In some embodiments, the value of spin threshold parameter 112 may vary based on thread wake state 110. In some embodiments, spin threshold parameter 112 may increase a predetermined amount for each unsuccessful attempt to acquire synchronization object 108. In some embodiments, spin threshold parameter 112 varies according to a formula for each unsuccessful attempt to acquire synchronization object 108, e.g., application of a multiplier value to the current spin threshold parameter to generate a new spin threshold parameter. The foregoing applies similarly to spin threshold parameters 118 and 120.

Synchronization object 108 comprises a lock state parameter 124 and a synchronization object (SO) wake state parameter 126. Lock state parameter 124 stores a value indicating whether synchronization object 108 has been acquired by a thread, i.e., the thread has acquired the lock. Lock state parameter 124 may be either locked or unlocked corresponding to whether a thread has acquired the synchronization object to the exclusion of other threads.

SO wake state parameter 126 stores a value indicating the state of synchronization object 108. SO wake state parameter 126 may be normal, in-flight, and want-lock. An SO wake state parameter 126 of normal specifies that any thread may attempt to acquire synchronization object 108. Additionally, if synchronization object 108 is in a normal wake state, then a thread releasing the synchronization object for potential acquisition by other threads is allowed to wake a sleeping thread, e.g., a thread from sleeping list 122.

An SO wake state parameter 126 of in-flight specifies that a thread which has released synchronization object 108 has woken a sleeping thread and the woken thread is still able to attempt to acquire the synchronization object to the exclusion of other threads. That is, a sleeping thread has been woken, but the woken thread has neither acquired synchronization object 108 nor exceeded spin threshold parameter 112. If synchronization object 108 is in the in-flight state, a thread, which is holding acquired synchronization object 108 and is in the process of releasing the synchronization object, will not wake another sleeping thread, e.g., from sleeping list 122. Synchronization object 108 in the in-flight state is able to be acquired by threads other than the woken thread.

An SO wake state parameter 126 of want-lock specifies that a thread woken as a result of the release of synchronization object 108 by another thread is awake and ready to attempt to acquire the synchronization object. Threads other than the awakened thread wait, i.e., repeatedly loop to check on the availability of synchronization object 108 increasing the busy wait time of the threads, without attempting to acquire the synchronization object. If a thread other than the awakened thread has previously acquired the synchronization object prior to the woken thread becoming awake, e.g., during the time period that synchronization object 108 is in the in-flight state, the preceding thread continues execution with the acquired synchronization object. With synchronization object 108 in the want-lock state, the awakened thread is exclusively able to attempt to acquire the synchronization object. Acquisition of synchronization object 108 by the awakened thread causes SO wake state parameter 126 to be set to normal.

Figure 2:
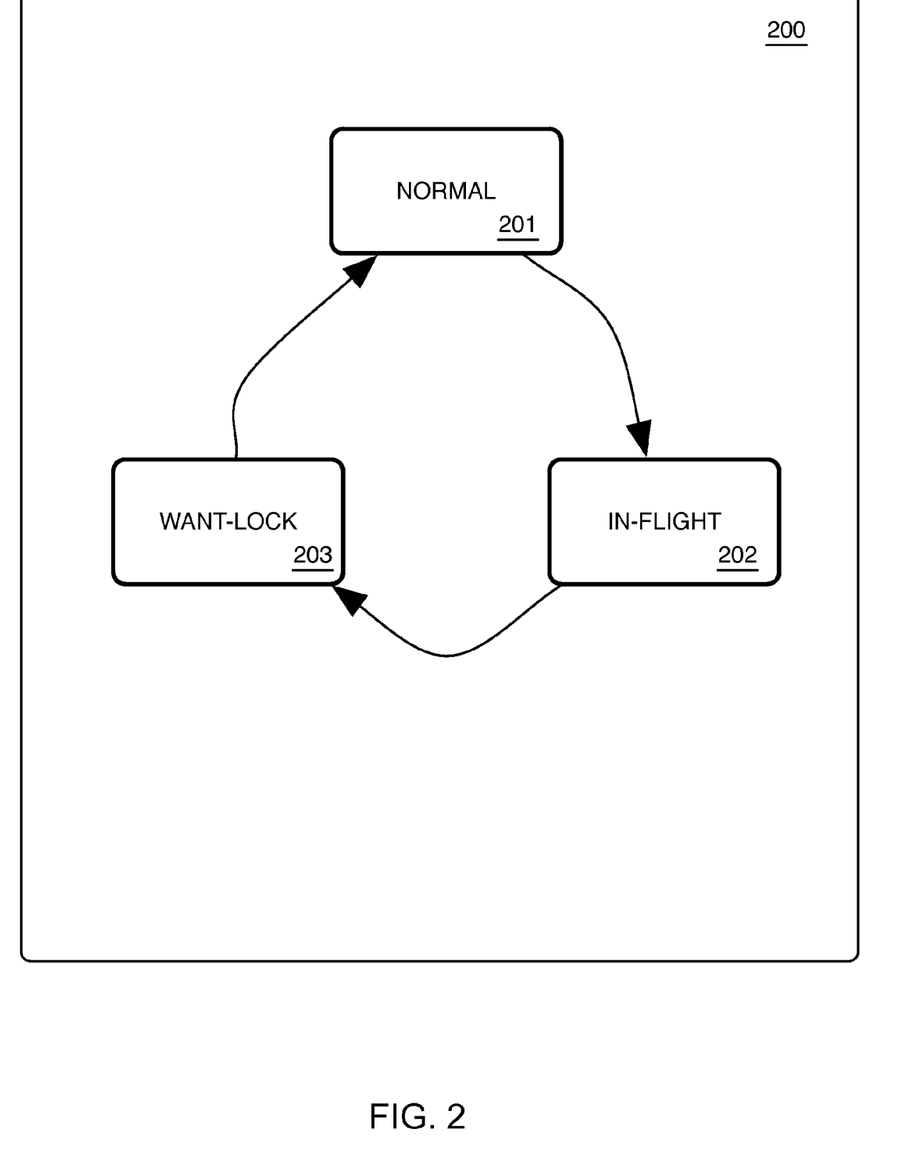
FIG. 2 is a high-level state transition diagram according to an embodiment.

FIG. 2 depicts a high level state diagram 200 of the states of synchronization object 108 according to synchronization object wake state parameter 126. As depicted, synchronization object 108 may transition from a normal state 201, i.e., indicated by SO wake state parameter 126 set to normal, to an in-flight state 202. Synchronization object 108 may transition from in-flight state 202 to a want-lock state 203 after the woken thread completes waking up. An "awake" thread is able to start executing code, i.e., a processor is able to begin executing the instructions comprising the thread. In the "in-flight" state, the thread is not yet executing code. Instead, the operating system is placing the thread on a run-queue for execution. After the thread moves to the front of the run-queue, the operating system removes the thread from the queue and the processor begins execution of the thread. At this point, the thread is said to be in an "awake" state. Synchronization object 108 may transition from want-lock state 203 to normal state 201 if either the woken thread acquires the synchronization object or the woken thread exceeds spin threshold parameter 112 value and sleeps.

Returning to FIG. 1, portion 100 further comprises a sleeping list 122 for maintaining a list of sleeping threads, i.e., threads which have exceeded a spin threshold parameter value, e.g., spin threshold parameter value 112. In some embodiments, sleeping list 122 may be maintained as a first-in, first-out (FIFO) queue, or other sorting mechanism. As depicted, sleeping list 122 comprises a sleeping thread reference 128 indicating a thread, e.g., thread C 106, which is sleeping. In alternate embodiments, different forms of sleeping list 122 may be used. In some other embodiments, sleeping list 122 may be sorted and/or order in a particular manner.

Figure 3:
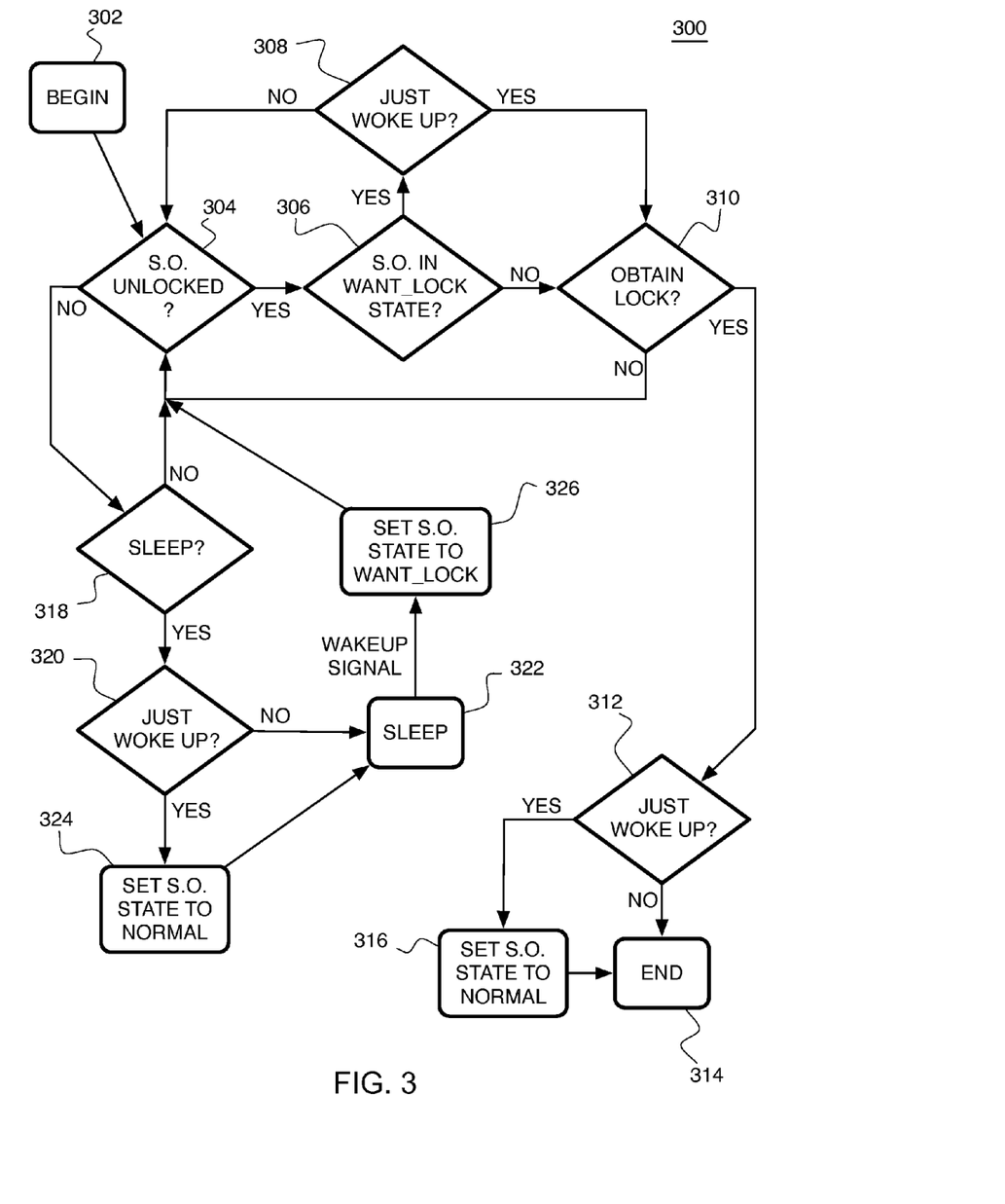
FIG. 3 is a high-level functional flow diagram of a lock acquire flow according to an embodiment.

FIG. 3 depicts a high-level functional flow diagram of a lock acquire flow 300 as executed by a thread, e.g., thread A 102, attempting to acquire synchronization object 108 to the exclusion of other threads. The flow begins at begin 302 and proceeds to synchronization object (SO) unlocked check 304 wherein thread A 102 determines the status of lock state parameter 124.

If synchronization object 108 is unlocked, i.e., lock state parameter 124 indicates an unlocked value, the flow proceeds to SO want-lock state check 306. During SO want-lock state check 306, thread A 102 determines whether SO wake state parameter 126 indicates that synchronization object 108 is in want-lock state 203. If SO wake state parameter 126 indicates that synchronization object 108 is in want-lock state 203, the flow proceeds to woke up query 308.

During woke up query 308, thread A 102 determines whether the thread was woken by a thread releasing synchronization object 108, i.e., the thread determines whether it has recently woken up, based on checking thread wake state parameter 110. If thread wake state parameter 110 indicates a false or negative value, the flow proceeds to return to SO unlocked check 304. If thread wake state parameter 110 indicates a true or positive value, the flow proceeds to obtain lock query 310 wherein thread A 102 attempts to acquire synchronization object 108 to execute a particular set of instructions, e.g., the thread attempts to atomically obtain the synchronization object.

Returning to SO want-lock state check 306, if SO wake state parameter 126 indicates that synchronization object 108 is not in want-lock state 203, the flow proceeds to obtain lock query 310.

Continuing with obtain lock query 310, if thread A 102 is not successful at acquiring synchronization object 108, the flow proceeds to return to SO unlocked check 304. If thread A 102 is successful at acquiring synchronization object 108, the flow proceeds to a woke up query 312 similar to woke up query 308. During woke up query 312, thread A 102 determines whether the thread was woken by a thread releasing synchronization object 108, i.e., the thread determines whether it has recently woken up, based on checking thread wake state parameter 110.

If thread wake state parameter 110 indicates a false or negative value, the flow proceeds to end 314 and thread A 102 causes execution of a set of instructions to the exclusion of the other threads. If, however, thread wake state parameter 110 indicates a true or positive value, the flow proceeds to set SO state to normal 316 prior to proceeding to end 314 and causing execution of the set of instructions. During set SO state to normal 316, thread A 102 causes SO wake state parameter 126 to indicate that synchronization object 108 is in normal state 201. In some embodiments, during set SO state to normal 316, thread A 102 causes synchronization object 108 to transition to normal state 201.

Returning to SO unlocked check 304, if synchronization object 108 is locked, i.e., lock state parameter 124 indicates a locked value, the flow proceeds to sleep query 318. During sleep query 318, thread A 102 determines whether spin threshold parameter 112 value has been exceeded by the thread. For example, thread A 102 determines whether it has exceeded a busy wait time or whether a maximum number of synchronization object 108 acquisition attempts has been exceeded.

In some embodiments, if thread A 102 exceeds spin threshold parameter 112 value, the spin threshold value may be increased to provide the thread an increased amount of time to attempt to acquire synchronization object 108. For example, in some embodiments, a formula may be applied to determine a modified spin threshold parameter 112 value to which thread A 102 is compared, e.g., each unsuccessful acquisition attempt may cause the spin threshold to be doubled.

If thread A 102 determines that spin threshold parameter 112 has not been exceeded, the flow returns to SO unlocked check 304 and proceeds as above. If, however, thread A 102 determines that spin threshold parameter 112 has been exceeded, the flow proceeds to a woke up query 320 similar to woke up queries 308 and 312. During woke up query 320, thread A 102 determines whether the thread was woken by a thread releasing synchronization object 108, i.e., the thread determines whether it has recently woken up, based on checking thread wake state parameter 110.

If thread wake state parameter 110 indicates a false or negative value, the flow proceeds to sleep 322 wherein thread A 102 sleeps, e.g., a reference to the thread is placed on sleeping list 122 and the thread sleeps. If, however, thread wake state parameter 110 indicates a true or positive value, the flow proceeds to a set SO state to normal 324, similar to set SO state to normal 316, prior to proceeding to sleep 322 and causing thread A 102 to sleep. During set SO state to normal 324, thread A 102 causes SO wake state parameter 126 to indicate that synchronization object 108 is in normal state 201. In some embodiments, during set SO state to normal 324, thread A 102 causes synchronization object 108 to transition to normal state 201.

After receipt of a wakeup signal generated during a thread releasing synchronization object 108, thread A 102 begins to wake up and proceeds to set SO state to want-lock 326. Thread A 102 sets SO wake state parameter 126 to want-lock 326 after waking up and becoming runnable. During set SO state to want-lock 326, thread A 102 causes SO wake state parameter 126 to indicate that synchronization object 108 is in want-lock state 203. Also, during set SO state to want-lock 326, thread A 102 causes thread wake state parameter 110 to indicate that the thread was woken, e.g., the parameter is set to a true or positive value. The flow then returns to SO unlocked query 304. Thread A 102 proceeds to attempt to acquire synchronization object 108 and because the synchronization object is in want-lock state 203, the thread is not competing against other threads to acquire the synchronization object.

Figure 4:
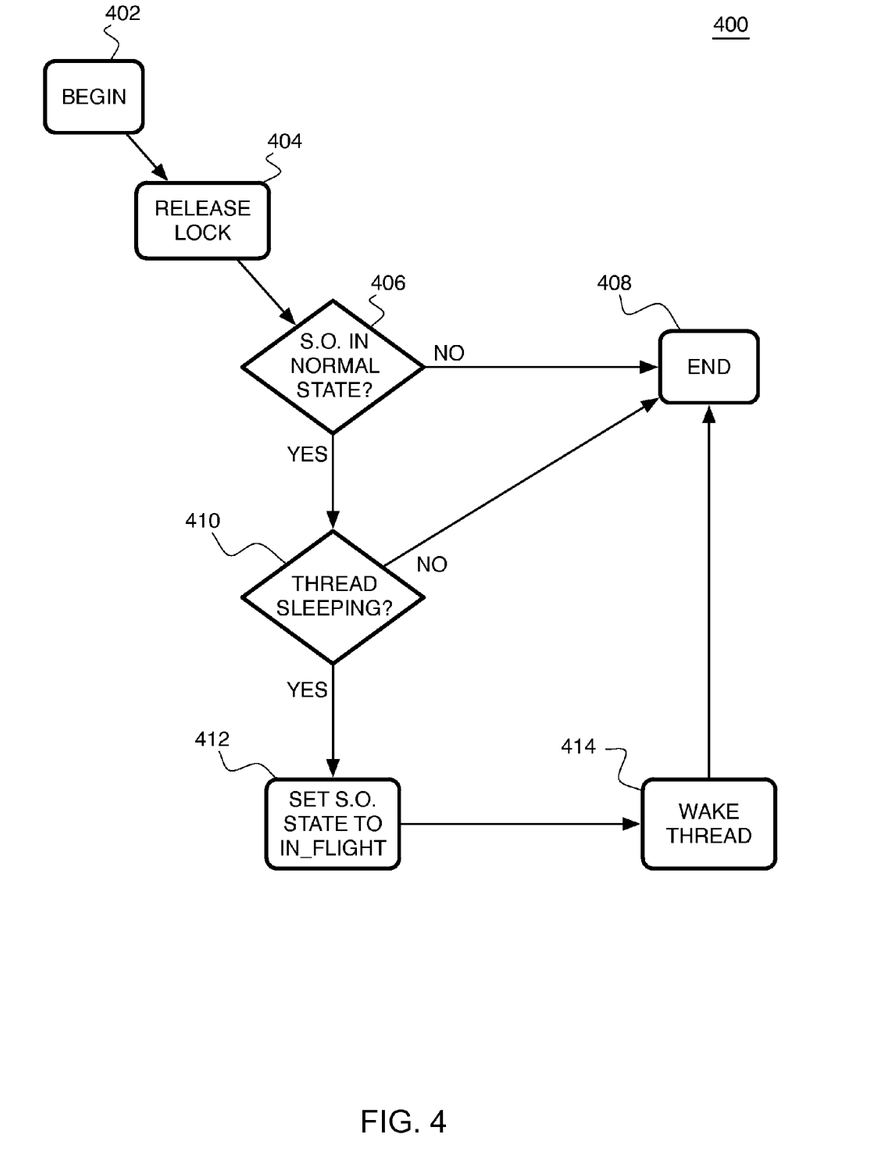
FIG. 4 is a high-level functional flow diagram of a lock release flow according to an embodiment.

FIG. 4 depicts a high-level functional flow diagram of a lock release flow 400 as executed by a thread, e.g., thread A 102, releasing synchronization object 108. The flow begins at begin 402 and proceeds to release lock 404 wherein thread A 102 causes lock state 124 to indicate the release of synchronization object, i.e., the lock state is set to unlocked. The flow proceeds to SO in normal state 406 wherein thread A 102 determines whether SO wake state parameter 126 indicates that synchronization object 108 is in normal state 201. If SO wake state parameter 126 indicates that synchronization object 108 is not in normal state 201, the flow proceeds to end 408 and the thread has released the synchronization object.

If SO wake state parameter 126 indicates that synchronization object 108 is in normal state 201, the flow proceeds to thread sleeping query 410 wherein thread A 102 determines whether a thread is sleeping, e.g., the thread checks sleeping list 122 for a reference to a sleeping thread. If the outcome of thread sleeping query 410 is negative, the flow proceeds to end 408. If, however, the outcome of thread sleeping query 410 is positive, the flow proceeds to set SO state to in-flight 412. During set SO state to in-flight 412, thread A 102 causes SO wake state parameter 126 to indicate that synchronization object 108 is in in-flight state 202. At this point, thread A 102 limits the number of sleeping threads, e.g., from sleeping list 122, which will be woken. In some embodiments, a single sleeping thread will be woken by thread A 102.

In some other embodiments, more than one sleeping thread is woken by thread A 102. If more than one sleeping thread is woken, a counter may be used to maintain a count of the number of "in-flight" threads.

The flow proceeds to wake thread 414 wherein thread A 102 causes the generation of a wakeup signal and subsequent transmission of the signal to the selected sleeping thread to be woken, e.g., by selecting the first thread reference 128 at the top of sleeping list 122. In some embodiments, the selected sleeping thread may be a thread other than the first thread in a sleeping list 122, e.g., a frequency value, weighted value, or other mechanism may be used to determine the next thread to be woken. The selected thread receives the wakeup signal and begins to wake. The flow proceeds to end 408.

Figure 5:
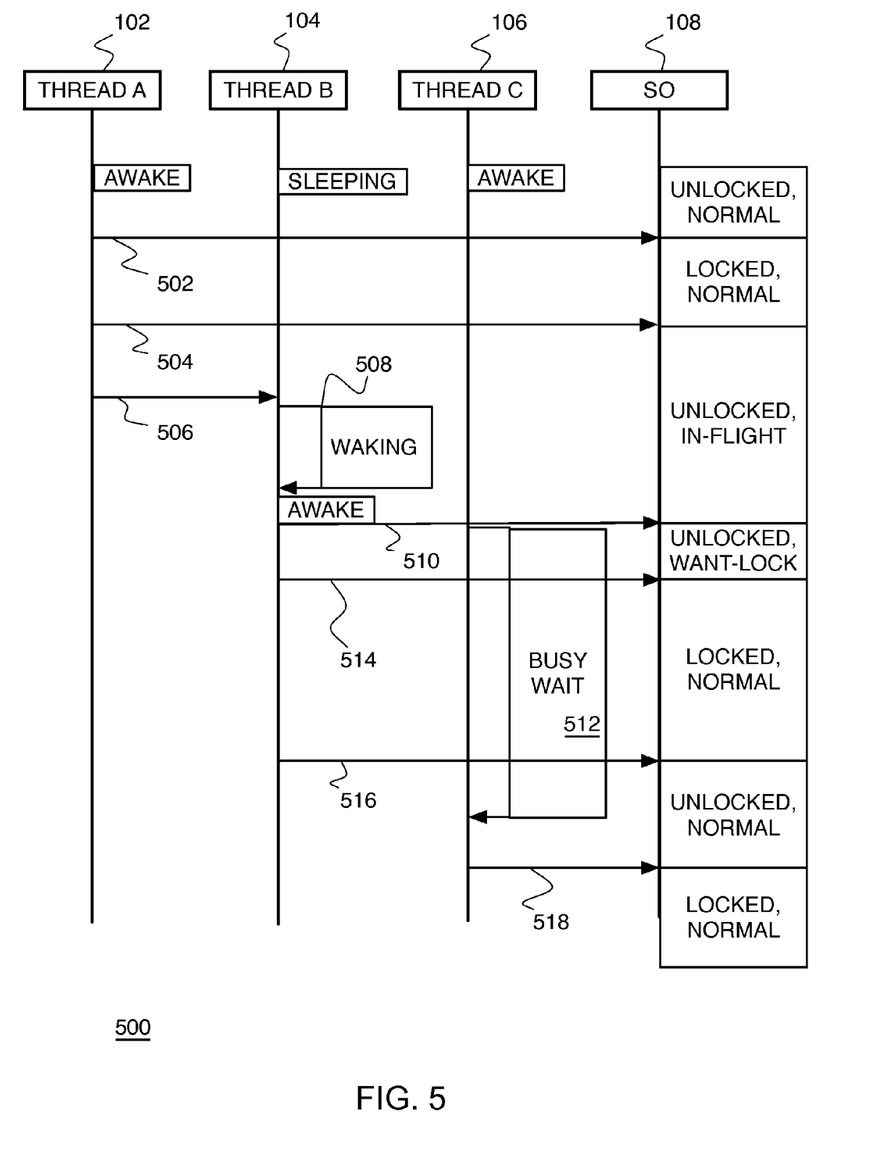
FIG. 5 is a message sequence diagram according to an embodiment.

FIG. 5 is a message sequence diagram of a portion 500 of an interaction between, and states of, threads 102, 104, 106 and synchronization object 108. Time proceeds downward toward the bottom of the page. At the beginning of sequence portion 500, threads 102, 106 are awake, thread 104 is sleeping, and synchronization object is unlocked and in normal state 201. Thread A 102 determines, e.g., as in SO unlocked check 304, that synchronization object 108 is unlocked and in normal state 201 and acquires the synchronization object (502). After acquiring the synchronization object 108, thread A 102 sets lock state 124 to locked.

After performing particular instructions while holding the lock, i.e., acquired synchronization object 108, thread A 102 releases the synchronization object (504) and sets lock state 124 to unlocked and SO wake state parameter 126 to in-flight. Thread A 102 selects sleeping thread B 104 and causes the transmission of a wakeup signal to the selected thread (506).

After receipt of the wakeup signal, thread B 104 wakes up (508) and then sets SO wake state parameter 126 to want-lock (510). During the time period after thread B 104 wakes up (after setting SO wake state parameter 126 to want-lock 510), thread C 106 begins busy waiting 512 while waiting to acquire synchronization object 108.

After thread B 104 is awakened, thread B 104 acquires synchronization object 108 (514) and sets lock state 124 to locked and sets SO wake state parameter 126 to normal. Thread C 106 busy waits (512), i.e., continues incrementing a spin counter, during this time period.

After performing particular instructions while holding the lock, i.e., acquired synchronization object 108, thread B 104 releases the synchronization object and sets lock state to unlocked. There are no sleeping threads for thread B 104 to waken.

Thread C 106 determines, e.g., as in SO unlocked check 304, that synchronization object 108 is unlocked and in normal state 201 and acquires the synchronization object (518). Thread C 106 sets lock state 124 to locked.

Figure 6:
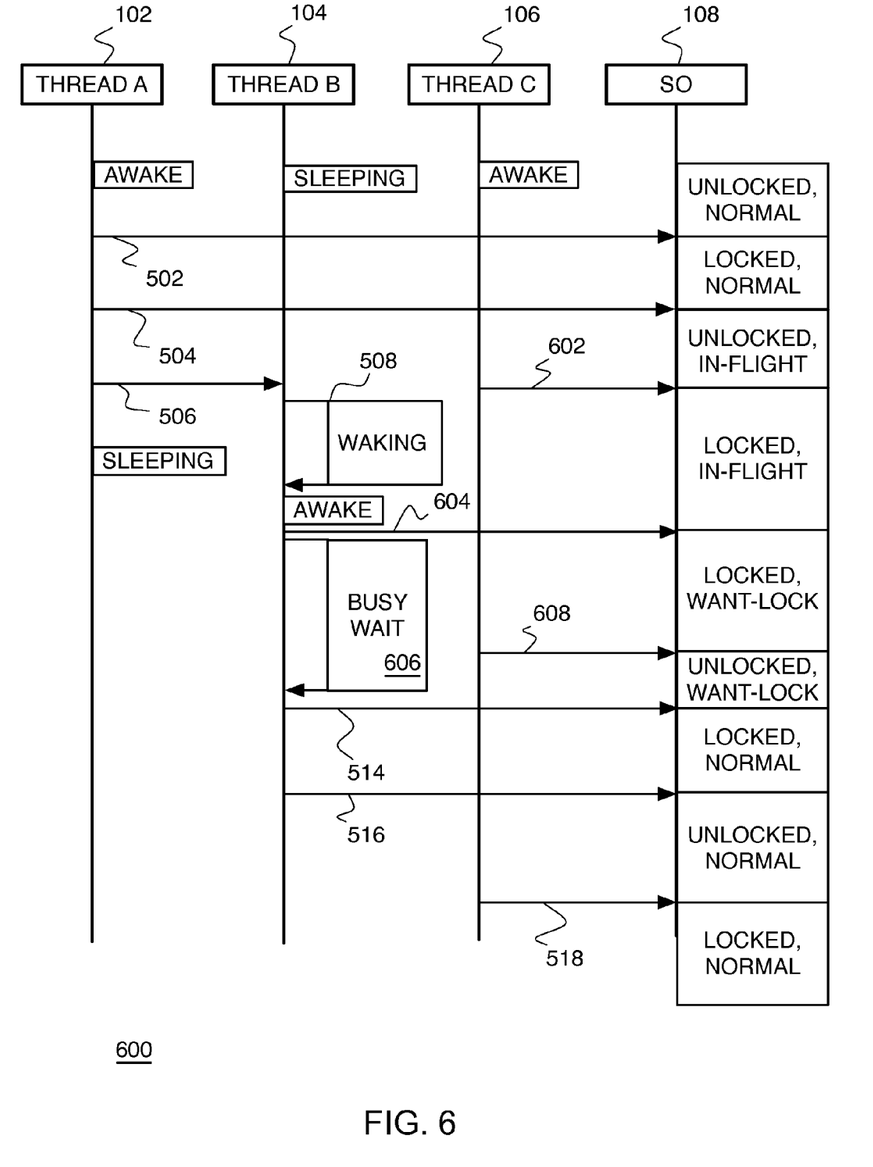
FIG. 6 is another message sequence diagram according to an embodiment.

FIG. 6 is a message sequence diagram of a portion 600 of an interaction between, and states of, threads 102, 104, 106 and synchronization object 108. Time proceeds downward toward the bottom of the page and interactions which are the same use like reference numerals between FIGS. 5 and 6. At the beginning of sequence portion 600, threads 102, 106 are awake, thread 104 is sleeping, and synchronization object is unlocked and in normal state 201. Thread A 102 determines, e.g., as in SO unlocked check 304, that synchronization object 108 is unlocked and in normal state 201 and acquires the synchronization object (502). After acquiring the synchronization object 108, thread A 102 sets lock state 124 to locked.

After performing particular instructions while holding the lock, i.e., acquired synchronization object 108, thread A 102 releases the synchronization object (504) and sets lock state 124 to unlocked and SO wake state parameter 126 to in-flight. Thread A 102 selects sleeping thread B 104 and causes the transmission of a wakeup signal to the selected thread (506).

Differing from FIG. 5, thread C 106 determines synchronization object 108 is unlocked and in in-flight state 202 and acquires (602) the synchronization object prior to thread B 104 waking up and changing the synchronization object state, i.e., to want-lock.

After receipt of the wakeup signal, thread B 104 begins waking up (508) and after waking up sets SO wake state parameter 126 to want-lock (604). During the time period that thread B 104 is waking up (508), thread C 106 performs particular instructions requiring the thread C to hold the acquired synchronization object, i.e., lock, to the exclusion of other threads. After thread B 104 is awake, the thread B busy waits (606) waiting to acquire synchronization object 108. Thread B 104 busy waits (606), i.e., continues incrementing a spin counter, during this time period. Thread C 106 releases synchronization object 108 (608) and sets lock state 124 to unlocked.

After thread C 106 releases synchronization object 608, thread B 104 acquires (514) the synchronization object and sets lock state 124 to locked and sets SO wake state parameter 126 to normal.

After performing particular instructions while holding the lock, i.e., acquired synchronization object 108, thread B 104 releases the synchronization object and sets lock state to unlocked. There are no sleeping threads for thread B 104 to waken.

Thread C 106 determines, e.g., as in SO unlocked check 304, that synchronization object 108 is unlocked and in normal state 201 and acquires the synchronization object (518).

Figure 7:
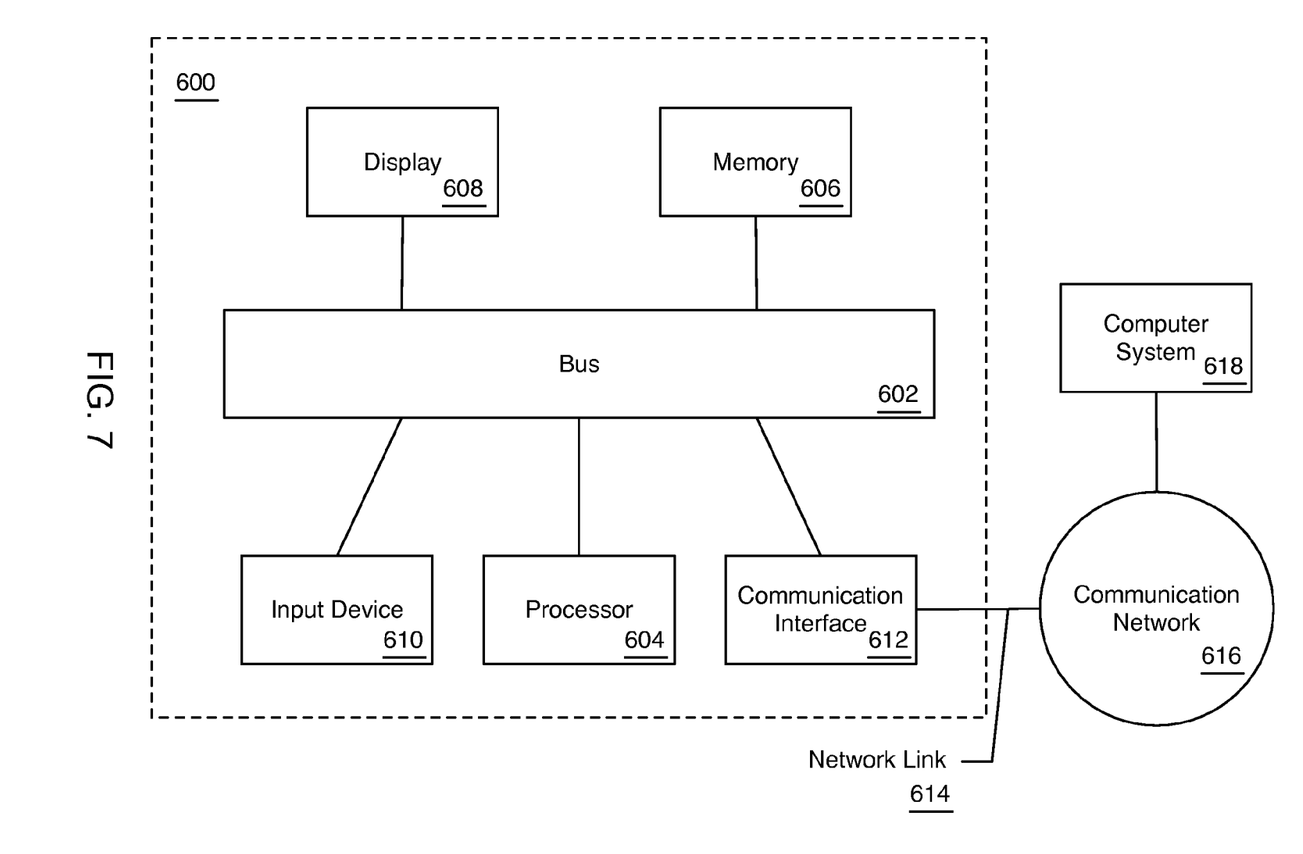
FIG. 7 is a high-level block diagram of a computer system usable in conjunction with an embodiment.

FIG. 7 is a block diagram illustrating an exemplary computer system 700 upon which an embodiment may be implemented. Computer system 700 includes a bus 702 or other communication mechanism for communicating information, and a processor 704 coupled with bus 702 for processing information. Computer system 700 also includes a memory 706, such as a random access memory (RAM) or other dynamic storage device, coupled to the bus 702 for storing instructions to be executed by processor 704. Memory 706 also may be used for storing temporary variables or other intermediate information during execution of instructions to be executed by processor 704.

Computer system 700 is coupled via bus 702 to display 708, such as a liquid crystal display (LCD) or other display technology, for displaying information to the user. Input device 710, described above, is coupled to bus 702 for communicating information and command selections to the processor 704.

According to one embodiment, computer system 700 operates in response to processor 704 executing sequences of instructions contained in memory 706 or communication interface 712. Such instructions may be read into memory 706 from a computer-readable medium or communication interface 712.

Execution of the sequences of instructions contained in memory 706 causes the processor 704 to perform the process steps described above. In alternative embodiments, hard-wired circuitry may be used in place of or in combination with computer software instructions to implement the embodiments. Thus, embodiments are not limited to any specific combination of hardware circuitry and software.

Computer system 700 also includes a communication interface 712 coupled to the bus 702. Communication interface 712 provides two-way data communication. For example, communication interface 712 may be a wireless communication link. In any such implementation, communication interface 712 sends and receives electrical, electromagnetic or optical signals which carry digital data streams representing various types of information.

Network link 714 typically provides data communication through one or more networks to other devices. For example, network link 714 may provide a connection through communication network 716 to computer system 700 or to data equipment operated by a service provider (not shown). The signals through the various networks and the signals on network link 714 and through communication interface 712, which carry the digital data to and from computer system 700, are exemplary forms of carrier waves transporting the information.

Computer system 700 can send messages and receive data, including program code, through the network(s), network link 714 and communication interface 712. Received code may be executed by processor 704 as it is received, and/or stored in memory 706 for later execution. In this manner, computer system 700 may obtain application code in the form of a carrier wave.

What is claimed is:

1. A method of controlling thread access to a synchronization object, comprising:

sending a signal to wake a sleeping first thread after a second thread releases a synchronization object; and setting, by the second thread, a value of the synchronization object to transition the synchronization object to an in-flight state indicating that the synchronization object is available to be acquired, the first thread to remain awake for a predetermined time if a third thread acquires the synchronization object in the in-flight state before the first thread acquires the synchronization object in the in-flight state, wherein the in-flight state is where the second thread has released the synchronization object and the first thread has received a wake up signal but before the first thread is able to execute; and setting, by the first thread, the value of the synchronization object to transition the synchronization object from the in-flight state to a want-lock state indicating that the synchronization object is only available to be acquired by the first thread after the third thread releases the synchronization object.

2. The method as claimed in claim 1, further comprising: acquiring, by the first thread, the synchronization object in the in-flight state before the predetermined time elapses and before the third thread acquires the synchronization object.

3. The method as claimed in claim 1, wherein sending the signal to wake the sleeping first thread occurs after the synchronization object transitions to the in-flight state.

4. The method as claimed in claim 1, further comprising: acquiring, by the third thread, the synchronization object before the synchronization object transitions to the want-lock state; and
releasing, by the third thread, the synchronization object after the synchronization object transitions to the want-lock state, wherein the synchronization object remains in the want-lock state after the third thread releases the synchronization object.

5. The method as claimed in claim 4, further comprising: acquiring, by the first thread, the synchronization object in the want-lock state.

6. The method as claimed in claim 1, wherein sending the signal to wake the sleeping first thread further comprises: selecting the sleeping first thread from a sleeping thread list according to a predetermined order.

7. The method as claimed in claim 6, wherein the predetermined order comprises a first-in, first-out order.

8. The method as claimed in claim 1, further comprising: causing, by the first thread, the synchronization object to transition to a normal state that indicates that the synchronization object is available to be acquired, if the first thread sleeps prior to acquiring the synchronization object.

9. The method as claimed in claim 8, wherein the first thread sleeps if a spin threshold value is exceeded.

10. The method as claimed in claim 9, wherein the spin threshold value is exceeded by at least one of a number of attempts to acquire the synchronization object or elapse of the predetermined time.

11. The method as claimed in claim 9, wherein the spin threshold value is modified by a value for each unsuccessful attempt to acquire the synchronization object by the first thread.

12. The method as claimed in claim 1, wherein the synchronization object is acquirable by the first thread before the synchronization object is acquirable by the second thread.

13. A tangible computer-readable storage medium storing instructions that, when executed, cause a processor to at least:
implement a synchronization object comprising a state parameter indicating a state of the synchronization object, the state parameter configured to transition the state to at least an in-flight state indicating that the synchronization object is available to be acquired by any thread not sleeping, wherein the in-flight state is where a first thread has released the synchronization object and a second thread has received a wake up signal but before the second thread is able to execute, and the state parameter is configured to transition the state of the synchronization object from the in-flight state to a want-lock state, the want-lock state to indicate that the synchronization object is only available to be acquired by the second thread after a third thread acquires and releases the synchronization object.

14. The computer-readable storage medium as claimed in claim 13, wherein the synchronization object further comprises a lock parameter indicating that the synchronization object is in either a locked state or an unlocked state, and wherein at least one thread is to attempt to acquire the synchronization object if the synchronization object is in an unlocked state.

15. The computer-readable storage medium as claimed in claim 13, wherein the state parameter of the synchronization object is further configured to transition the synchronization object to a want-lock state indicating that the synchronization object is available to be acquired only by a most recently awakened thread.

16. The computer-readable storage medium as claimed in claim 15, wherein the instructions, when executed, cause the processor to implement a thread having a wake state parameter, the thread to attempt to acquire the synchronization object if the state of the synchronization object is in-flight or the wake state parameter indicates the thread is the most recently awakened thread and the state is want-lock.

17. The computer-readable storage medium as claimed in claim 16, wherein the thread further comprises a spin threshold.

18. The computer-readable storage medium as claimed in claim 17, wherein the spin threshold indicates at least one of a number of attempts to acquire the synchronization object or elapse of the predetermined time.

19. The computer-readable storage medium as claimed in claim 16, wherein the instructions, when executed, cause the processor to apply a formula to the spin threshold for each unsuccessful attempt to acquire the synchronization object by the thread.

20. The computer-readable storage medium as claimed in claim 16, wherein the thread is to set the state of the synchronization object to the in-flight state after release of the synchronization object.

21. The computer-readable storage medium as claimed in claim 20, wherein the thread is to wake another sleeping thread.

22. A tangible computer-readable storage medium storing instructions which, when executed by a processor, cause the processor to at least:
send a signal to wake a sleeping first thread;
release, by a second thread, a synchronization object; and
set, by the second thread, a value of the synchronization object to transition the synchronization object to an in-flight state indicating that the synchronization object is available to be acquired, the first thread to remain awake for a predetermined time if a third thread acquires the synchronization object in the in-flight state before the first thread acquires the synchronization object in the in-flight state, wherein the in-flight state is where the second thread has released the synchronization object and the first thread has received a wake up signal but before the first thread is able to execute; and
set, by the first thread, the value of the synchronization object to transition the synchronization object from the in-flight state to a want-lock state indicating that the synchronization object is only available to be acquired by the first thread after the third thread releases the synchronization object.

23. The computer-readable storage medium as claimed in claim 22, wherein the instructions, when executed, cause the processor to send the signal to wake the sleeping first thread after the synchronization object is released.

* * * * *